United States Patent [19]
Adams

[11] 3,740,905
[45] June 26, 1973

[54] INSULATION AND CONDENSATION CONTROL SYSTEM

[75] Inventor: Clarence R. Adams, Kirkland, Wash.

[73] Assignee: The Boegin Company, Seattle, Wash.

[22] Filed: Dec. 22, 1971

[21] Appl. No.: 210,882

[52] U.S. Cl............... 52/173, 52/406, 165/19, 236/44, 244/119
[51] Int. Cl.............. B64c 1/00, F24f 3/14
[58] Field of Search........ 165/15, 19, 20, 21; 98/1.5; 236/44; 244/119; 52/750, 406, 404, 173

[56] References Cited
UNITED STATES PATENTS
3,424,231   1/1969   Truhan.............. 236/44 R

*Primary Examiner* — John E. Murtagh
*Attorney* — Bernard A. Donahue and Glenn Orlob

[57] ABSTRACT

In a climate controlled chamber, an insulation system for controlling condensation of water vapor and for channeling the condensate to a central collection point. The preferred embodiment involves an aircraft fuselage having specially constructed insulation blankets arranged in overlapping fashion in close proximity to the exterior skin of the fuselage. Each blanket has a sandwich construction comprising a centrally located corrugated metallic foil member surrounded by layers of insulating material such as glass fiber mat. The insulating materials are of predetermined thicknesses to maintain the metallic foil member within a temperature range wherein it will act as a condenser plate for water vapor. The corrugations of the foil member are vertically aligned and spaced from the insulation material on the interior side such that vertical drain passageways are formed to allow draining of the condensed water. The drain passageways turn outwardly toward the fuselage exterior skin at the lower end of each of the blankets to thereby direct the water out of the blanket and downwardly along the interior of the skin to a central collection point at the bottom of the fuselage for optional recycling through a humidifier system, or removal from the aircraft.

7 Claims, 3 Drawing Figures

PATENTED JUN 26 1973   3,740,905
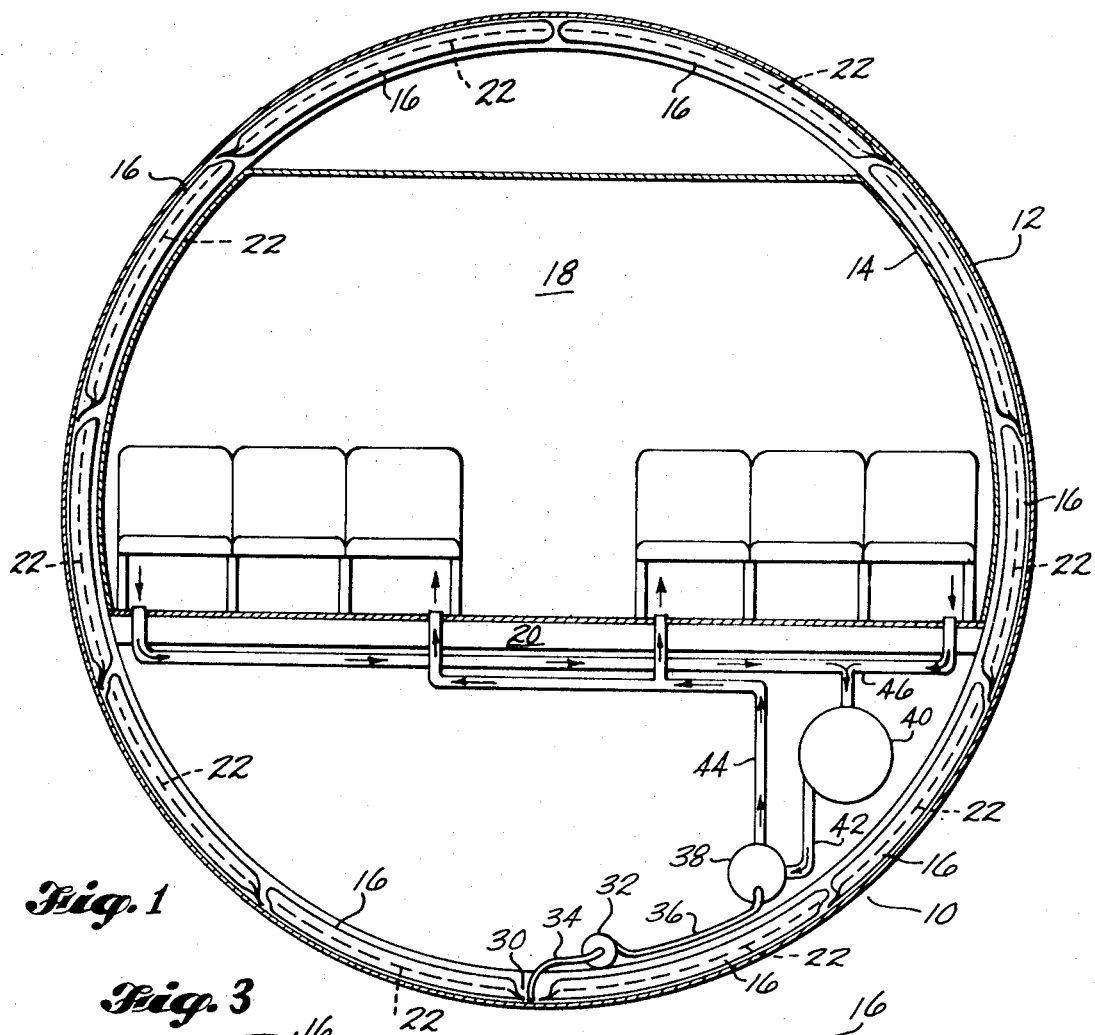
Fig. 1
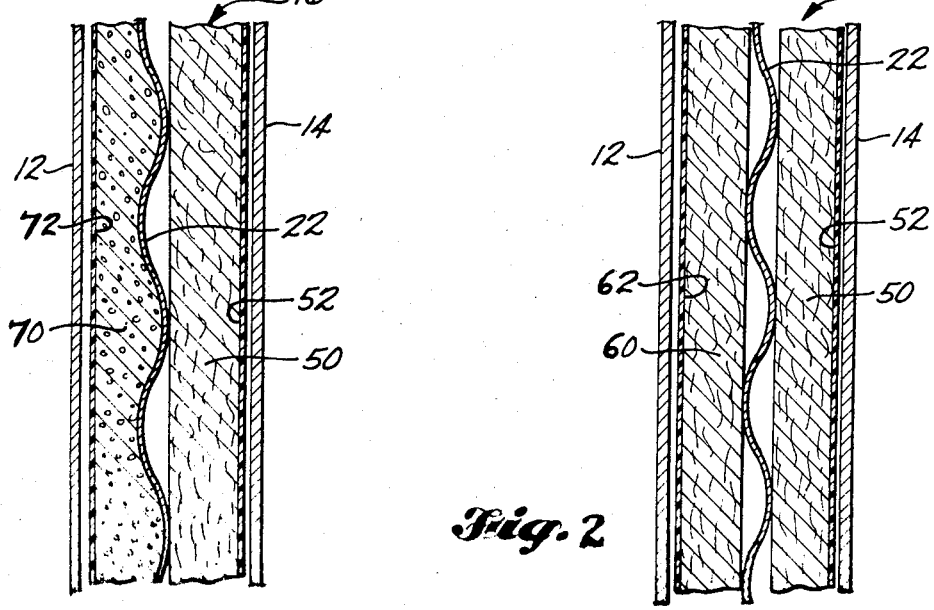
Fig. 3
Fig. 2

INSULATION AND CONDENSATION CONTROL SYSTEM

BACKGROUND OF THE INVENTION

1. Field of the Invention

This invention relates to an insulation system for a climate controlled chamber; and, more particularly, to specially constructed insulation blankets arranged in overlapping fashion near the exterior skin of an aircraft fuselage such that condensation of water vapor will occur along a corrugated metal foil centrally located within each blanket, and the condensate will be drained by gravity action through and out of the blankets to a central collection point.

2. Description of the Prior Art

In climate controlled chambers utilizing lightweight exterior walls, uncontrolled condensation of water vapor will create problems. For example, in the passenger compartment of an airplane flying subsonically at cruise altitude, the fuselage skin temperature will be of the order of −20°F, and water vapor condensation will continuously occur. Once condensation begins, lowered vapor pressures at the skin due to the condensation reaction will cause the rate of migration of water vapor toward the skin surface to be increased. Problems generated by such condensed water include the following: (1) accumulation and retention of up to 1,000 lbs. of moisture in insulation blankets of medium sized passenger aircraft with consequent reduction in aircraft payload capacity and range; (2) increased metal corrosion rates for structural joints; (3) reduced thermal and acoustic characteristics for the insulation; and (4) collection of pools of moisture in the overhead ceiling trim of the passenger compartment with dripping, and occasional dumping of water into the passenger area. These problems are due to be greatly aggravated by the scheduled introduction of humidifers in passenger aircraft to combat complaints about the dry cabin atmospheres, which currently have relative humidities of less than 5 percent.

In present aircraft insulation design, attempts have been made to minimize condensation problems by sewing or cementing the insulation blankets together to induce the condensation to occur between the insulation and the fuselage skin. However, this expedient has not been successful. The blankets must be allowed to breathe because of pressure changes, and water vapor will enter the blankets through small holes or natural perforations. At certain times in the flight environment, the interior of the blanket will be found to be at a temperature which will cause condensation to occur. Water vapors will then condense and be absorbed by the insulation fibers. Such condensed water is then retained in the insulation, being unable to leave through natural perforations or stitching holes, because of the surface tension phenomenon. The increased weight reduces payload and range, creates maintenance problems from sagging interiors, and the moisture reduces thermal and acoustical characteristics of the insulation while increasing structural corrosion rates. Similar problems are known to occur in other lightweight climate controlled chambers, such as those found in surface transportation vehicles and shipping containers.

SUMMARY OF THE INVENTION

Accordingly, it is a principal object of this invention to provide an insulation system which intercepts water vapor traveling from the interior of a climate controlled chamber to the outer walls, then condenses it and drains it in a predetermined fashion.

A further object of this invention is to provide an aircraft insulation system which prevents accumulation and retention of moisture within the insulation materials and establishes predetermined passageways for directing condensed moisture to a central collection point where it can be optionally either recycled through a humidification system or dumped overboard.

A related object of this invention is to provide an insulation system for the passenger compartment of an aircraft fuselage which substantially eliminates uncontrolled condensation of water vapor directly on the aircraft skin and support structure to thereby reduce the rate of corrosion and deterioration of structural materials and joints.

These and other objects of this invention are achieved in the preferred embodiment by the use of specially constructed insulation blankets arranged in overlapping fashion in close proximity to the exterior skin surface of an aircraft fuselage. Each blanket has a sandwich configuration comprising a centrally located corrugated metallic foil member surrounded by insulating material. The insulating materials on each side of the foil member are of proper thicknesses to maintain the metallic foil member within a temperature range wherein it will act as a condenser for water vapor. The corrugation valleys of the foil member are vertically aligned so that the condensed water vapor will drain downwardly. At the lower end of each blanket the foil member is preformed such that it is bent outwardly toward the exterior skin to thereby deposit the water along the exterior skin for draining to a collection point at the bottom center of the fuselage, where the water may be recycled by pumping to a humidifier or conveniently jettisoned from the aircraft.

BRIEF DESCRIPTION OF THE DRAWINGS

FIG. 1 is a cross-sectional view of an aircraft fuselage in which the insulation system of this invention has been installed.

FIG. 2 is a cross-sectional view showing the sandwich construction of the insulation blankets of FIG. 1.

FIG. 3 is a cross-sectional view of an optional sandwich construction for the insulation blankets of FIG. 1.

DESCRIPTION OF THE PREFERRED EMBODIMENTS

In FIG. 1, an aircraft fuselage section 10 can be seen to include an exterior skin 12, inner trim panels 14, and a plurality of specially constructed overlapping insulation blankets 16 surrounding passenger compartment 18. Floor beams 20 support passenger seats and cabin air conditioning ducts as shown.

The blankets 16 are of sandwich construction and have a centrally located corrugated metallic foil member 22 which extends vertically along the entire length of each blanket, and is turned outwardly in the direction of the exterior skin 12 at the bottom of the blankets. As is more apparent in the other FIGURES, each of the metallic foil members 22 is centrally located within each blanket 16, being surrounded by insulating materials of a predetermined thickness. The thickness of the insulating materials is established so as to maintain the metallic foil members within a proper temperature range to act as condenser plates for water vapors.

During cruise flight, water vapors within passenger compartment 18 will continuously travel through trim panels 14, into the insulation blankets 16, and outwardly toward the cold exterior skin 12. Upon contacting metal foil members 22, the water vapors will condense and drain downwardly along vertical passageways provided by the valleys of the corrugated foil members to the bottom edge of the blankets, where the passageways and foil members turn outwardly to deliver the water droplets onto the interior surface of the skin 12. The skin 12, or plastic conduits attached thereto (not shown), will then serve to continue draining of the water deposited from each blanket, downwardly to the bottom center of the aircraft where a pool is accumulated at 30 in FIG. 1. It should be noted that for purposes of illustration, the blankets 16 are shown to be spaced apart in the overlap regions. However, in a practical embodiment such spaces will be minimized or eliminated altogether to preserve the insulating characteristics of the system.

The pooled water at 30 may be conveniently jettisoned out of the aircraft by conventional means, if desired. However, as suggested previously, the recent trend in cabin air conditioning design is in the direction of using humidifiers for passenger comfort. Accordingly, the FIG. 1 preferred embodiment involves a water recycling system comprising a water pump 32, an intake hose 34, and an output hose 36 connected to a humidifier 38. An air conditioning unit 40 directs conditioned air through conduit 42 to the humidifier 38, which increases the moisture content of the air before it is discharged into fresh air ducts 44 for delivery to the passenger area 18 through floor beams 20. Return air is drawn from the passenger floor area through return air ducts 46 back to air conditioning unit, to complete the system. It will be recognized that the system shown is schematic only and that in a practical embodiment the various elements would be rearranged for convenience. Also, a floor vent system has been illustrated rather than a more conventional design to simplify the portrayal of the duct work.

FIG. 2 shows a cross-sectional view of the fuselage wall of FIG. 1, with a blanket 16 installed between exterior skin 12 and trim panel 14. The blanket 16 can be seen to include an interior glass fiber mat 50 covered by a water vapor permeable cover 52. Cover 52 is preferably coated with a reflective material to minimize radiation heat losses. The mat 50 is flat sided and its outer side is in contact with the raised portions of the corrugated metallic foil member 22. An exterior glass fiber mat 60 rests against the opposite raised portions of foil member 22, and is capped with a water permeable cover 62. As noted previously, the thicknesses of the mats 50 and 60 are each independently selected to maintain the temperature of foil member 22 within the proper range to act as a condenser plate for water vapor during cruise flight. The corrugations of the foil members 22 are vertically oriented with respect to the airplane. The vertically extending valleys of foil members 22 provide passageways for gravity drainage of condensate to the lower end of each blanket 16. For a typical cruise flight environment of a subsonic aircraft, insulation thicknesses of the order of one inch on each side have been found to maintain proper condenser temperatures. It will be apparent to persons skilled in this art that the required thicknesses of the insulation materials on each side of the foil member 22 can be estimated using calculations based on thermal conductivity values and temperature extremes. The objective is to maintain the temperature of foil member 22 above the freezing point of water but below the dew point temperature. However, such calculations should be verified by testing, to establish an optimum design for a particular aircraft. The glass fiber insulation used for mats 50 and 60 is non-wicking such that they will not retain moisture. The corrugated metallic foil member 22 is preferably aluminum, although other metals may be used. In aircraft which operate over wide temperature extremes, it may be desirable to connect resistance heating elements to metallic foil members 22 to maintain the metal temperature above freezing, rather than to increase the thickness of insulation for extreme conditions.

FIG. 3 is a cross-sectional view of an optional sandwich construction for the blankets 16. In the FIG. 3 embodiment, the outer insulating material is a closed cell foam 70, blown in place and adhering to foil member 22 during manufacture of the blanket. A water permeable coating 72 is applied as a cover for foam 70 on its outer side. The FIG. 3 configuration is considerably stiffer than that shown in FIG. 2 because of the adhesion of the foam to the foil member. It will also be somewhat more expensive to manufacture and harder to install because of its stiffness.

Based on the foregoing, it will be apparent that the insulation system of this invention provides a novel means for controlling condensation of water vapor, and for channeling and collecting condensate in a climate regulated chamber, such as an aircraft fuselage. Modifications and variations of the preferred embodiments shown will be apparent to persons skilled in this art. Accordingly, it is intended in the appended claims to cover all such variations and modifications.

What is claimed and desired to be secured by U.S. Letters Patent is:

1. In an insulation system for a climate controlled chamber having cold exterior walls: a plurality of insulation blankets installed in overlapping fashion in close proximity and generally parallel to said exterior walls; each of said blankets having a sandwich cross-section comprising: a corrugated metallic foil member centrally located between an inner layer and an outer layer of insulating material, and oriented such that its corrugations extend vertically with respect to said chamber; said inner layer of insulating material having relatively flat sides with its outer side pressed against the raised portions of the corrugations of said foil member to thereby cooperate with the valleys of said corrugations to form open passageways within said blanket which extend vertically with respect to said chamber; each of said inner and outer layers of insulating materials having predetermined thicknesses to provide means for maintaining the temperature of said metallic foil member above the freezing point and below the dew point of water vapor; and wherein during normal operating conditions within said climate controlled chamber, water vapor migrating toward said cold exterior walls passes through said inner layer of insulating material to condense upon contact with said foil member and the resulting condensate is drained by gravity action downwardly through said open passageways and out of said blankets at the lower ends thereof.

2. The system of claim 1 wherein at the lower end of each of said blankets, said foil member is bent outwardly a predetermined amount so as to deposit the condensed water at a collection passageway along said exterior walls for draining to a central collection point at the bottom of said chamber.

3. The system of claim 2 which includes means for recycling condensed water from said central collection point back to a humidifier which increases the moisture content of the atmosphere within said climate controlled chamber.

4. The system of claim 1 wherein said inner insulation material comprises a flat non-wicking glass fiber mat capped on its inner side by a water permeable cover.

5. The system of claim 4 wherein said outer insulation material comprises a flat non-wicking glass fiber mat having its inner side pressed against the raised portions of the corrugations of said foil member and capped on its outer side by a water permeable cover.

6. The system of claim 4 wherein said outer insulation material comprises a closed cell foam adhering to the foil member and capped on its outer side by a water permeable cover.

7. The system of claim 1 which includes means for maintaining the temperature of the foil member above the freezing point of water comprising resistance heating elements connected to the foil members.

* * * * *